Patented Oct. 4, 1932

1,880,432

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

AZO DYESTUFF AND METHODS OF MAKING SAME

No Drawing.   Application filed July 5, 1928.   Serial No. 290,699.

In the purification of phenol obtained by the hydrolysis of chlorbenzene, the still residues have been found to contain in appreciable amount both o- and p-hydroxydiphenyl. Both compounds are known and are represented by the graphic formulas

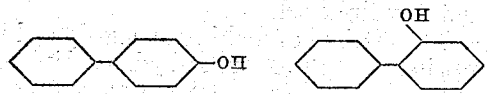

The aforesaid hydroxydiphenyl compounds are phenolic in character and may be regarded as phenyl-phenols, similar, for example, to the methyl-phenols or cresols, in which a phenyl, instead of a methyl, group is substituted in the benzene nucleus. Such phenyl-phenols accordingly possess the properties common to phenols in general, and are capable of reacting in similar ways. For instance they may be coupled with diazotized, or tetrazotized, aromatic amino bodies forming thereby new and valuable azo dyes. Such dyes in comparison with the corresponding phenol dyes are somewhat deeper in color, and are markedly superior with respect to fastness to light and washing.

The invention, then, consists of a new product, viz., an azo dye of the aforesaid character, together with the steps involved in making such dye hereinafter fully described and particularly pointed out in the claims, the following description setting forth but several of the various ways in which the principle of the invention may be employed.

I have found that the operation of coupling either the o- or p-hydroxydiphenyl with a suitable diazotized aromatic amine, or derivative thereof, may be readily carried out according to the usual methods, the resulting dyes possessing the improved properties already referred to. Further, I have also found that when the hydroxy group of the hydroxydiphenyl component of such azo compound is alkylated, attaching thereto an alkyl group such as methyl $CH_3$, ethyl $C_2H_5$, or the like, the alkylated derivatives so obtained are dyes exhibiting in even greater degree the property of fastness to light and washing, as well as further improved color quality.

The alkylated azo dyes just described, upon treatment with a reducing agent, are split at the N double bond, yielding alkylated amino derivatives of hydroxydiphenyl, which in themselves are capable of being diazotized, and are starting materials for making other azo dyes. Derivatives of this character are more particularly described in my co-pending application Serial No. 311, 976, filed October 11, 1928.

By way of illustration the following examples are given, but it will be understood that the invention is equally applicable to the preparation of other derivatives of the character in hand.

I. Sulphanilic acid 58 parts is diazotized according to the usual method and coupled with 50 parts of p-hydroxydiphenyl dissolved in 28 parts of caustic soda and 700 parts of water, the mixture being kept cool and thoroughly stirred. Common salt is added to precipitate the dye, which is an orange colored crystalline powder. The methyl ether of this compound is then made by adding to the mixture 12½ parts of caustic soda and, with stirring, 39 parts of methyl sulphate. The reaction mixture becomes warm and in a short time forms a thick precipitate. The mass is heated to about 60° C. for about 20 minutes, then cooled and the precipitate filtered and washed with salt water. The product is the sodium salt of p-sulpho-benzene-azo-p-hydroxydiphenyl methyl ether from which the free acid compound is obtained by treatment with a mineral acid. Both the acid and its sodium salt consist of bright orange colored crystal flakes, slightly soluble in water, which dye wool directly in orange shades, fast to light and washing. The formula is represented thus:—

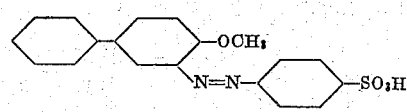

II. The analogous dye, derived from o-hydroxydiphenyl by coupling with diazotized sulphanilic acid and subsequent methylation, is produced in an entirely similar manner to that described in Example I. The product has the formula:—

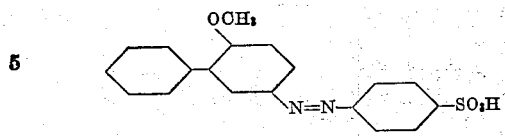

This compound is likewise a fine crystalline orange colored powder, somewhat soluble in water. Both the azo compound and the methyl ether thereof dye wool a clear orange color, distinctly deeper in shade than in the case of the p-hydroxydiphenyl derivatives.

It is a characteristic of the dyes just described, both of the azo-hydroxydiphenyl compounds and of the alkyl ethers thereof, and equally of the free sulphonic acids and the salts of such acids, that they are more sparingly soluble in water than the corresponding derivatives of other phenols, and in contradistinction to such latter derivatives, can be readily crystallized from aqueous solution in substantially pure condition, thus affording a convenient method of separating and purifying such dyes.

By similar methods related mono-and polyazo compound can be made by coupling o- or p-hydroxydiphenyl with other diazotized, or tetrazotized, bodies or derivatives thereof.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of making an azo dye which comprises coupling a mono-hydroxydiphenyl with a diazotized aromatic amino compound of the benzene series, which diazotized aromatic amino compound contains a sulfonic acid group.

2. The method of making an azo dye which comprises coupling a mono hydroxy-diphenyl with diazotized sulfanilic acid.

3. The method of making azo dyestuffs which comprises diazotizing sulphanilic acid, and coupling p-hydroxydiphenyl therewith.

4. As a new product, an azo dye of the probable formula,

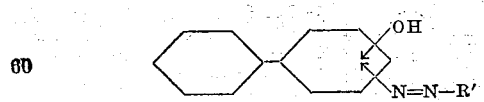

wherein R' represents an aromatic residue of the benzene series, which residue is further substituted by a sulfonic acid group.

5. As a new product, an azo dye of the probable formula,

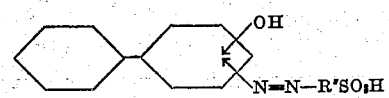

wherein R'' represents an aromatic residue of the benzene series.

6. As a new product, an azo dye of the probable formula,

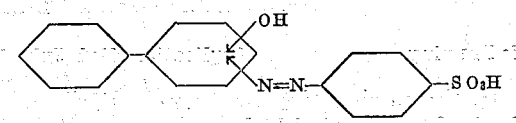

7. As a new product an azo dyestuff comprising p-hydroxydiphenyl coupled with diazotized sulphanilic acid.

8. As a new product p-sulpho benzene-azo-p-hydroxydiphenyl.

9. The method of making an azo dye which comprises coupling ortho-hydroxydiphenyl with a diazotized aromatic amino compound of the benzene series, which diazotized aromatic amino compound contains a sulfonic group.

10. As a new product, an azo dye comprising ortho-hydroxydiphenyl coupled with a diazotized aromatic amino compound of the benzene series, which diazotized aromatic amino compound contains a sulfonic group.

11. As a new product, an azo dye of the formula,

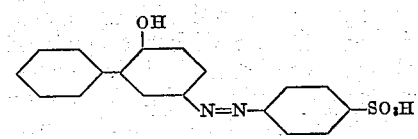

12. The method of making an azo dye which comprises coupling para-hydroxydiphenyl with a diazotized aromatic amino compound of the benzene series, which diazotized aromatic amino compound contains a sulfonic group.

13. As a new product, an azo dye comprising parahydroxydiphenyl coupled with a diazotized aromatic amino compound of the benzene series, which diazotized aromatic amino compound contains a sulfonic group.

14. The method of making an azo dye which comprises coupling a mono-hydroxydiphenyl with a diazotized aromatic amino compound.

15. The method of making an azo dye which comprises coupling ortho-hydroxydiphenyl with a diazotized aromatic amino compound.

16. The method of making an azo dye which comprises coupling para-hydroxy-diphenyl with a diazotized aromatic amino compound.

17. As a new product an azo dye having the general formula

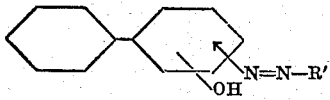

wherein R' represents an aromatic residue.

18. As a new product an azo dye comprising ortho-hydroxy-diphenyl coupled with a diazotized aromatic amino compound.

19. As a new product an azo dye comprising para-hydroxy-diphenyl coupled with a diazotized aromatic amino compound.

Signed by me this 27th day of June, 1928.

ERNEST F. GRETHER.